B. R. TAGGART.
DEMOUNTABLE WHEEL.
APPLICATION FILED NOV. 8, 1919.

1,371,710.

Patented Mar. 15, 1921.
2 SHEETS—SHEET 1.

INVENTOR.
Bridget R Taggart
BY
ATTORNEYS.

B. R. TAGGART.
DEMOUNTABLE WHEEL.
APPLICATION FILED NOV. 8, 1919.
1,371,710.
Patented Mar. 15, 1921.
2 SHEETS—SHEET 2.
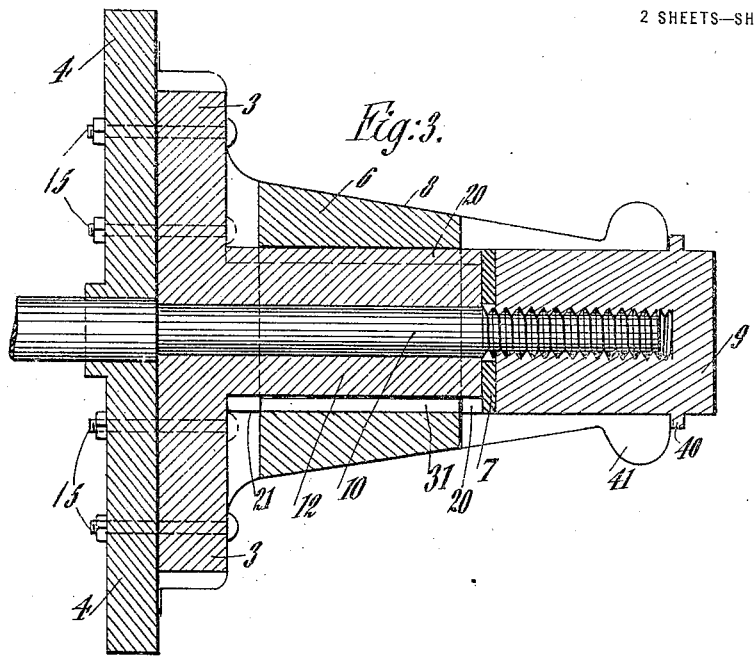
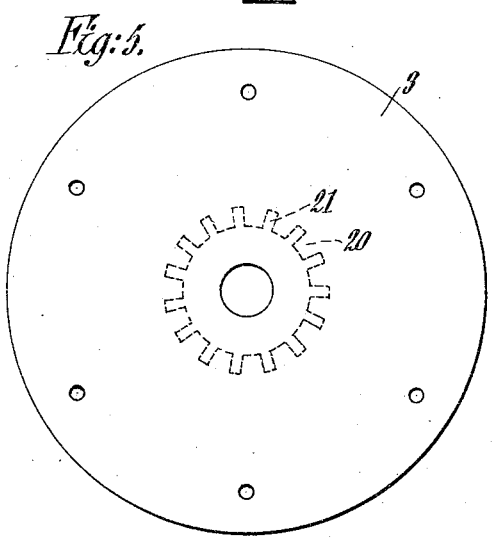
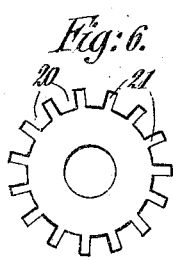
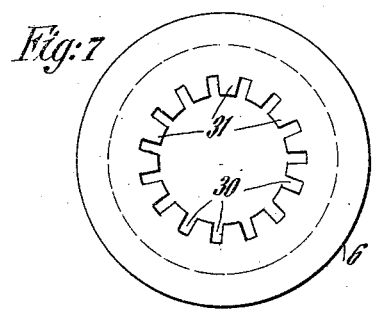
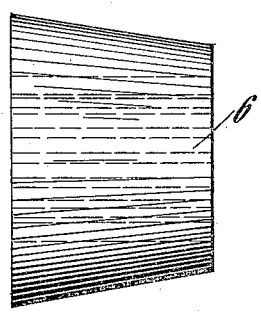
INVENTOR
Bridget R Taggart
BY
ATTORNEYS

UNITED STATES PATENT OFFICE.

BRIDGET R. TAGGART, OF MOUNT VERNON, NEW YORK.

DEMOUNTABLE WHEEL.

1,371,710. Specification of Letters Patent. Patented Mar. 15, 1921.

Application filed November 8, 1919. Serial No. 336,535.

*To all whom it may concern:*

Be it known that I, BRIDGET R. TAGGART, a citizen of the United States, residing at 320 Highland avenue, Mount Vernon, in the county of Westchester and State of New York, have invented certain new and useful Improvements in Demountable Wheels, of which the following is a specification.

My invention relates to a new and useful improvement in wire wheels.

One of the objects of my invention is to provide a reliable and efficient means for securing the wheel in place on the axle.

Another of the objects of my invention is to provide a simple and efficient means for tightening the spokes of the wire wheel.

Other objects of my invention will be disclosed in the following description and drawings which illustrate a preferred embodiment thereof.

Fig. 3 is a sectional view through the axle.

Fig. 4 is a side elevation of the inner hub member.

Fig. 5 is a front elevation of the inner hub member.

Fig. 6 is a rear elevation of the inner hub member.

Fig. 7 is a front elevation of the outer hub member.

Fig. 8 is a side elevation of the outer hub member.

Figure 1:
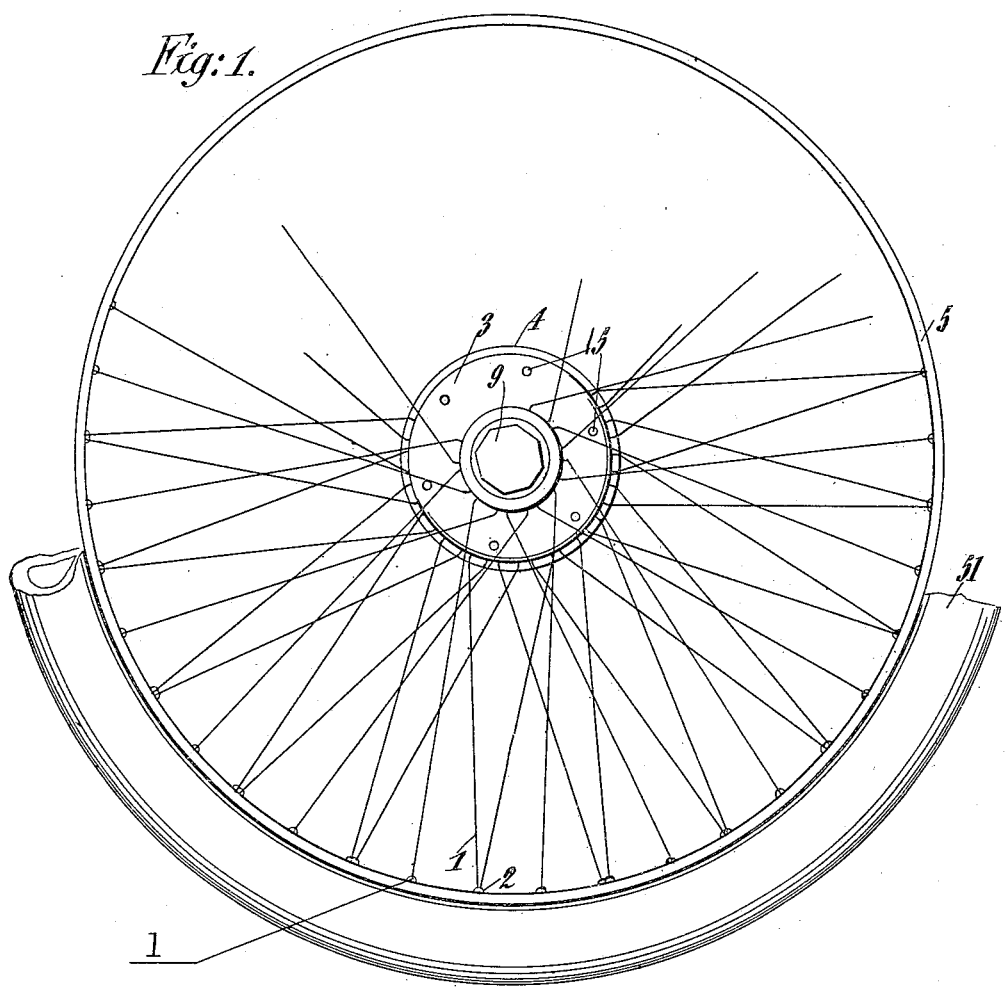
Figure 1 is an elevation.

The wire wheel is provided with the ordinary rim or felly 5 having the ordinary tire 51 secured thereto.

The brake drum 4 of the wheel is perforated at its center so as to allow the axle 10 to pass through it.

As seen in Fig. 3, that portion of the axle 10 projecting beyond the drum 4 is of less diameter than the portion within the drum 4.

The inner hub member 3 having a smooth cylindrical bore which fits over the said projection of the axle, is passed over the axle so that it abuts snugly against the brake drum 4 and against the wider portion of the axle.

The inner hub member 3 is secured to the brake drum 4 by a series of bolts 15 provided with the usual nuts.

As seen in Figs. 4 and 6, the projecting part of the inner hub member 3 is provided with a series of teeth 21 separated by grooves 20.

This construction enables the hub member 6 having a smooth periphery 8 and provided with coöperating grooves 31 and teeth 30, to be slipped over the inner hub member so as to prevent any relative movement of revolution between the said inner hub member and the said outer hub member.

As seen in Fig. 3, the periphery 8 of the outer hub member 6 is conical and is provided with a head 41.

To finally secure the parts in position, a perforated washer 7 made preferably of leather or other compressible material, is slipped over the projecting part of the axle 10, and a cap 9 is then screwed over the threaded tip of the axle 10, until it firmly compresses the washer 7 and until the flange 40 is firmly pressed against the head 41.

This double frictional engagement between the cap 9 and the washer 7 and the head 41, prevents the cap 9 from moving out of its proper position.

By means of the above structure the parts are very firmly and efficiently held and can be readily removed.

Figure 2:
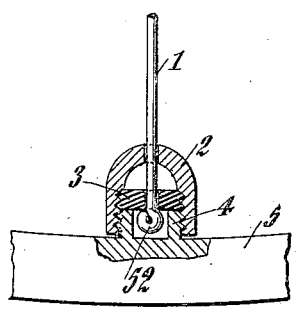
Fig. 2 is a section illustrating how a spoke is secured to the felly.

To tighten the spokes, a structure illustrated in Fig. 2 is employed.

Cups 4 which are externally threaded are secured to the felly 5 by any suitable means, such as by welding or the like. Thimble 2 which is internally threaded and a disk 3 which is externally threaded are then slipped over the spoke 1, and then the end of the spoke is bent so as to form a knob-like tip 52.

This knob-like tip is so formed and the length of the spoke is such, that by screwing the thimble 2 over the cup 4, the disk 30 firmly presses against the top of the cup 4, and the spoke 1 is stretched and firmly held in position in a tensed condition.

I have shown a preferred embodiment of my invention but I do not wish to be limited to the details thereof.

I claim—

In a wheel, the combination of an axle having a threaded end and an externally corrugated inner hub member adapted to fit over the said axle and leave the threaded end free, the said inner hub member having a flange portion, bolts for securing the said flange portion to the brake drum of the wheel, a compressible washer fitting over the said threaded end and abutting the said inner hub member, an internally corrugated outer hub member adapted to mesh with the corrugations of the axle member and having a head extending over the said threaded end of the axle, and a cap adapted to be screwed over the said threaded end and compress the said washer, the said cap having a flange adapted to frictionally engage the adjacent end of the said outer hub member when the said washer is compressed.

In testimony whereof I hereunto affix my signature.

BRIDGET R. TAGGART.